United States Patent [19]

Imamoto et al.

[11] Patent Number: 4,485,299
[45] Date of Patent: Nov. 27, 1984

[54] WORK SLIP READING AND SUMMING DEVICE

[75] Inventors: Tsunehiko Imamoto, Yokohama; Akio Yanase, Tokyo, both of Japan

[73] Assignee: Dai Nippon Insatsu Kabushiki Kaisha, Tokyo, Japan

[21] Appl. No.: 404,704

[22] Filed: Aug. 3, 1982

[30] Foreign Application Priority Data

Aug. 6, 1981 [JP] Japan .................................. 56-123306

[51] Int. Cl.³ .............................................. G06K 7/10
[52] U.S. Cl. ..................................... 235/377; 235/378; 235/432
[58] Field of Search ...................... 235/378, 432, 377; 346/33 MC, 111

[56] References Cited

U.S. PATENT DOCUMENTS

| 694,012 | 2/1902 | Gurr | 346/111 |
|---|---|---|---|
| 3,268,909 | 8/1966 | Green | 346/111 |
| 3,632,989 | 1/1972 | Kasischke | 346/33 MC |
| 3,703,630 | 11/1972 | Gelder | 364/401 |
| 4,270,043 | 5/1981 | Baxter | 235/432 |
| 4,310,844 | 1/1982 | Imamoto | 346/33 MC |

Primary Examiner—Harold I. Pitts
Attorney, Agent, or Firm—Koda and Androlia

[57] ABSTRACT

The record surface of a work slip on which work contents for a printing machine are recorded with a time axis separately according to the kinds of work, is read, so that the total periods of times are obtained separately according to the kinds of work. The total periods of time are displayed, and printed out.

6 Claims, 5 Drawing Figures

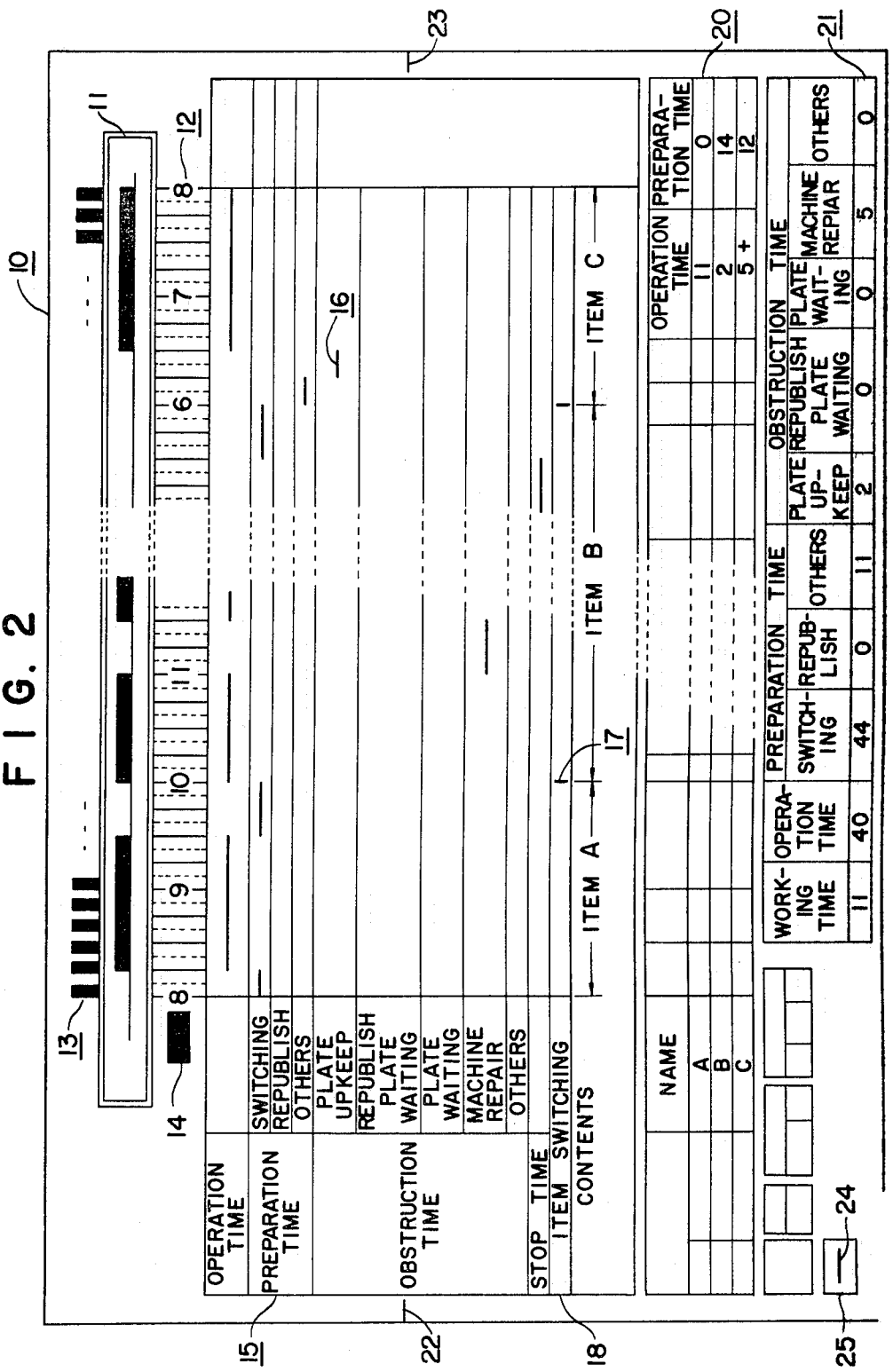

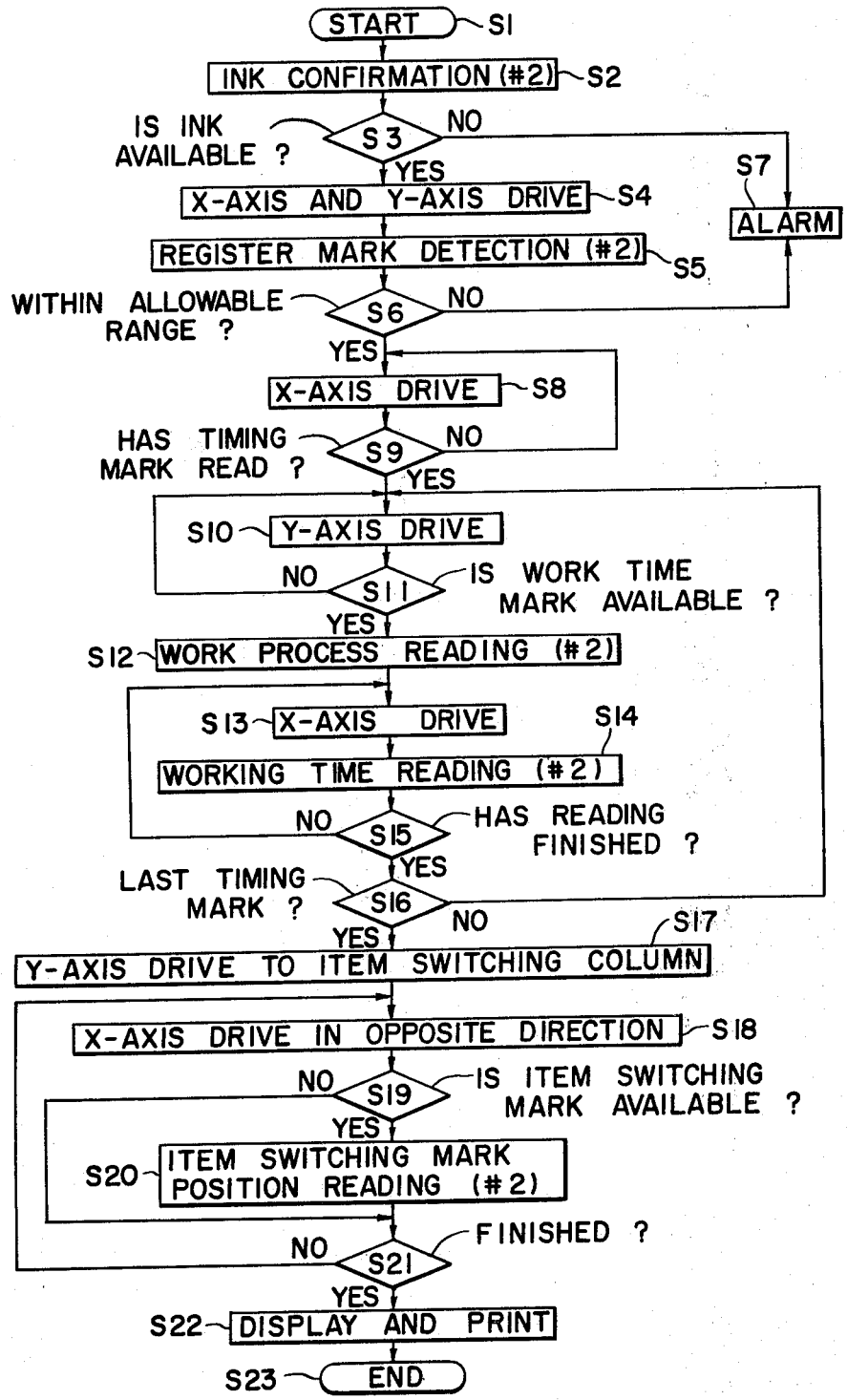

WORK SLIP READING AND SUMMING DEVICE

BACKGROUND OF THE INVENTION

This invention relates to a work slip reading and summing device which automatically reads a work slip for a printing machine to calculate the total periods of time separately according to the kinds of work and items, and displays and prints out the total periods of time thus calculated.

In the printing industry, it is essential to accurately find out the period of time for which a printing machine is not in operation or the reason why it is not in operation, in order to decrease printing cost, i.e., to increase the efficiency of production per unitary time.

For this purpose,, heretofore, the following method is employed: A work slip in which printing work processes are written is assigned to each printing machine, so that the operator writes work contents in the work slip. The data entered by the operators are summed up every predetermined time, so that the working conditions are analyzed and checked.

One example of the printing work processes to be checked by the operator is as shown below:

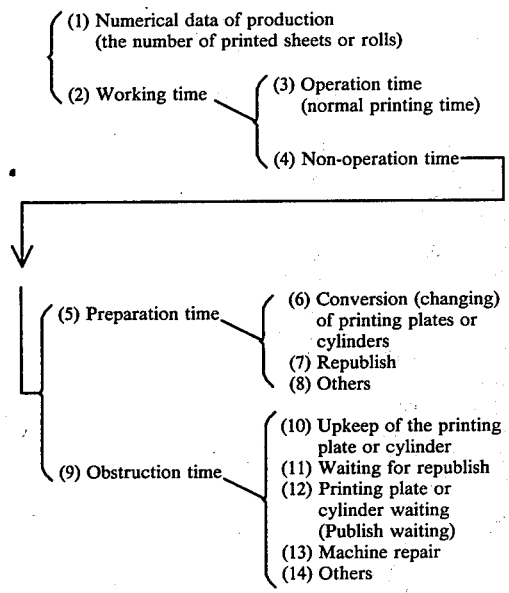

After all the work has been achieved, the operators calculate the contents of working time and write them in the respective columns on the work slips in which the above-described items are written. The calculation is rather troublesome and may include errors.

SUMMARY OF THE INVENTION

Accordingly, an object of this invention is to provide a work slip reading and summing device which reads a work slip in which the work contents of a printing machine are written, to provide the total periods of time separately according to the kinds of work.

The foregoing object and other objects of the invention have been achieved by the provision of a work slip reading and summing device in which, according to the invention, time data lines on a work slip in which work contents for a printing machine are written with a time axis separately according to the kinds of work by basing on a work graph which is prepared by recording the work contents for the printing machine, are read together with timing marks representative the time axis and are stored in correspondence to working time; after item switching marks recorded on the work slip have been read, the total periods of time are obtained separately according to the kinds of work and the processes from said stored data and the time positions of the item switching marks; and the total periods of times are displayed, and are printed in predetermined columns on the work slip.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In the accompanying drawings:

FIG. 2 is a plan view of an example of a work slip which is read by the device of the invention;

FIG. 5 is a flow chart showing one example of the operation of the device according to the invention.

DETAILED DESCRIPTION OF THE INVENTION

Figure 1:
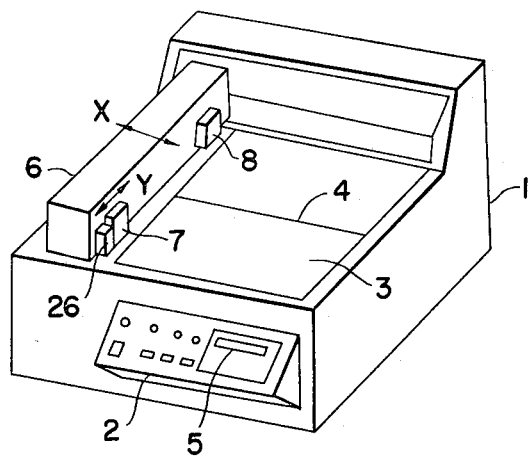
FIG. 1 is an external view of a work slip reading and summing device according to this invention.

FIG. 1 is an external view of a work slip reading and summing device according to this invention. An operating panel 2 is provided on the front side of a housing 1. A work slip placing plate 3 is provided on the upper surface. A work slip on which time data are recorded is placed on the work slip placing plate 3. The plate 3 has a straight register mark 4 so that a work slip can be set at a predetermined position. The work slip placed on the plate 3 is brought into close contact with the plate 3 by being sucked with a suction pump (not shown). A display unit 5 for displaying calculated time data, etc. is provided on the operating panel 2. A reading mechanism 6 is provided on the upper surface of the housing. The mechanism 6 operates to read recorded data out of a work slip on the work slip placing plate 3 and to print predetermined data on the work slip. For this purpose, two reading heads 7 and 8 and a writing head 26 are provided on a side of the reading mechanism 6. The reading mechanism 6 is movable in the direction of X-axis and the reading head 7 is movable in the direction of Y-axis. The reading head 8 and the writing head 26 are fixedly secured to the reading mechanism 6. The writing head 26 serves as a printer also, and includes a solenoid (not shown) and a felt pen (not shown) supported by the solenoid.

A work slip 10 employed in this invention is as shown in FIG. 2. A work graph 11 recorded by a work recorder (as disclosed by Japanese patent application Laid-Open No. 137972/1980) is bonded to a predetermined column on the work slip 10. Bar-shaped timing marks 13 corresponding to time marks 12 (8:00 A.M. through 8:00 P.M.) are provided above the work graph 11. A register mark 14 is provided adjacent to the time marks 12. The register mark 14 is used to determine whether the work slip 10 is placed at a predetermined position on the work slip placing plate 3 or not. Work time entering columns 15 in which the operator or the like writes time data lines 16 separately according to the kinds of work are provided below the time marks 12. An item switching column in which item switching marks 17 are written is provided below the work time entering columns 15. Time printing columns 20 for printing out total times calculated separately according to items and time printing columns 21 for printing out total times calculated separately according to the kinds of work are provided in the lower portion of the work slip 10. Position marks 22 and 23 are provided substantially at the midpoints of both sides of the work slip. The position marks 22 and 23 are aligned with the register mark 4 when the work slip is placed on the plate 3. Furthermore, a mark column 25 is provided in the lower portion of the work slip 10. An ink mark 24 is written in the mark column 25. The ink mark 24 is used to check whether ink for printing data on the work slip is available or not.

Figure 3:
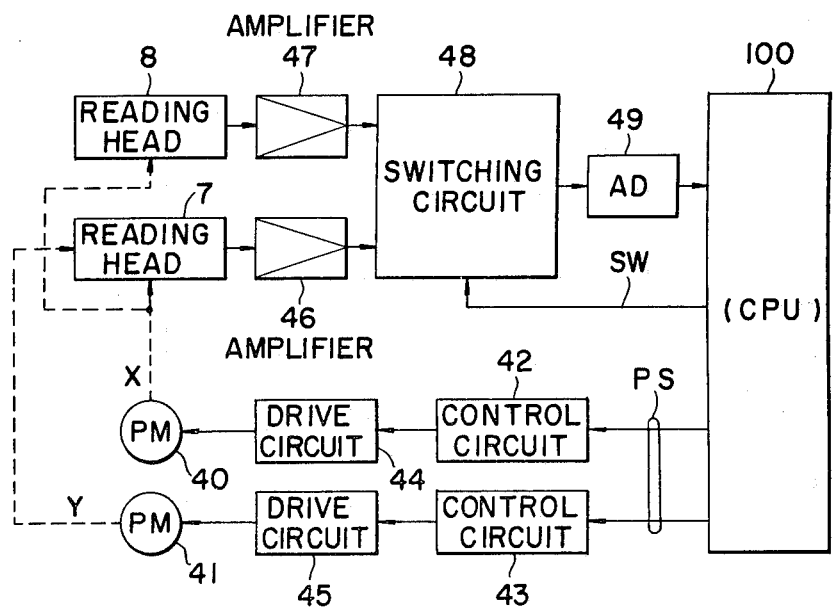
FIG. 3 is a block diagram showing a reading mechanism in the device of the invention.

The reading mechanism 6 is driven by pulse motors 40 and 41 as is apparent from FIG. 3. These pulse motors 40 and 41 are controlled through pulse motor control circuits 42 and 43 and pulse motor drive circuits 44 and 45 by a CPU (central processing unit) 100. The pulse motor 40 moves the reading mechanism 6 in its entirety in the direction of X-axis, while the pulse motor 41 moves the reading head 7 in the direction of Y-axis. Read signals from the reading heads 7 and 8 are applied respectively through amplifiers 46 and 47 to a switching circuit 48, and the signal which is selected in time division manner with the aid of a switching signal SW in the switching circuit 48 is applied to an A/D converter 49, where it is converted into a digital signal. The digital signal is applied to the CPU 100.

Figure 4:
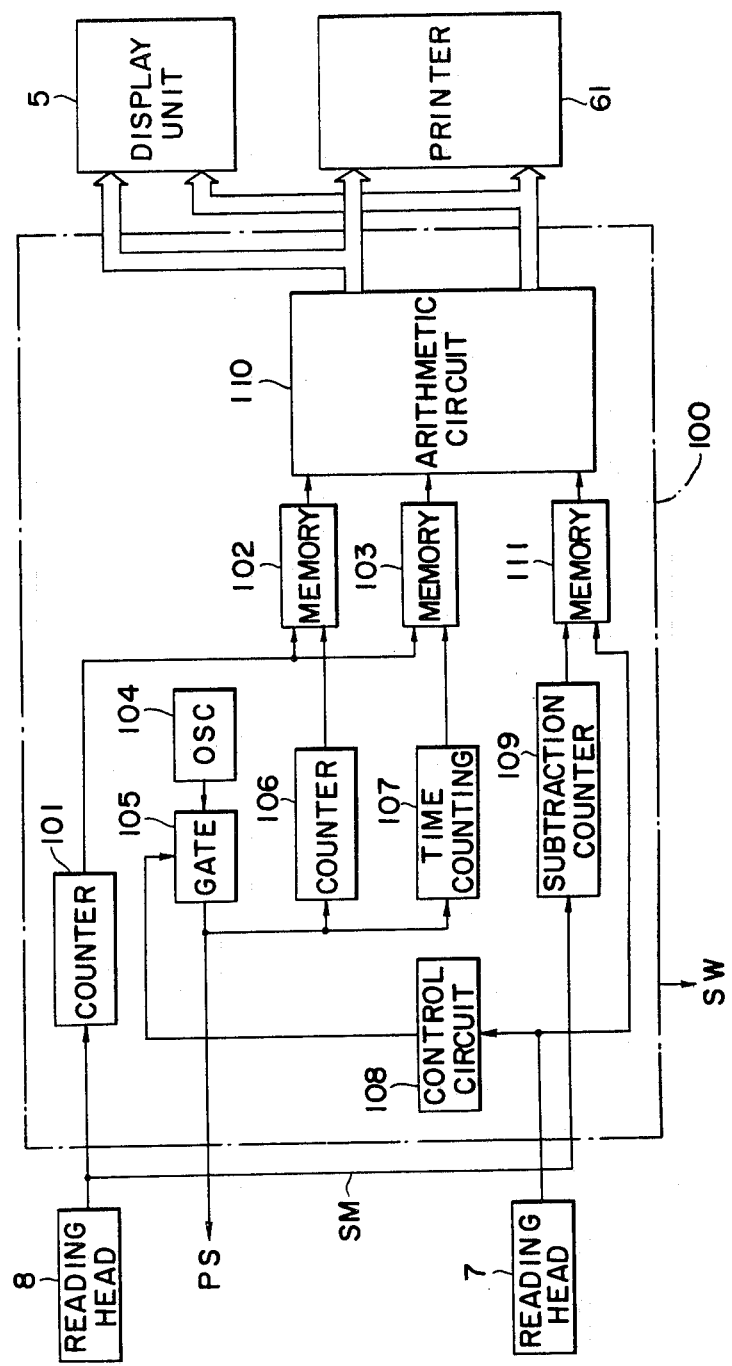
FIG. 4 is a block diagram showing one example of a summing system in the device of the invention.

The internal arrangement of the CPU 100 is as shown in FIG. 4. The CPU 100 has a counter 101 for counting the number of timing marks 13 which is read by the reading head 8. The count value (time data) of the counter 101 is applied to the memories 102 and 103. A pulse signal from a pulse oscillator 104 is applied through a gate circuit 105 to a counter 106 and a time counting circuit 107, and is outputted as a pulse motor control signal PS. The gate circuit 105 is controlled by a control circuit 108 which receives a detection signal from the reading head 7. A switching mark signal read by the reading head 7 is applied to a memory 111. A detection signal from the reading head 8 during X-axis reverse drive is supplied to a subtraction counter 109. The output of the subtraction counter 109 and the output of the memory 111 are supplied to an arithmetic circuit 110. The total periods of time which are calculated separately according to the items or the kinds of work are displayed on the display unit 5 and are printed in the predetermined columns 20 and 21 on the work slip 10 by a printer 61.

The operation of the work slip reading and summing device thus organized will be described with reference to a flow chart in FIG. 5.

First, a work graph 11 for the printing machine is bonded to the work slip 10. The time data lines 16 are written in the work time entering columns 15 separately according to the kinds of work. In the case where item switching occurs during the printing time, the item switching marks 17 are written in the item switching column 18.

Then, the work slip 10 is placed on the work slip placing plate 3. In this case, the position marks 22 and 23 of the work slip 10 should be aligned with the register mark 4 on the plate 3.

When, under this condition, the power switch on the operating panel 2 is turned on and the start button is operated (Step S1), the work slip 10 is brought into close contact with the plate 3 by the suction pump, and the printer 61 prints out the ink mark 24 in the mark column 25 on the work slip 10. The CPU 100 outputs the pulse motor control signal PS, so that the pulse motors 40 and 41 are driven through the control circuits 42 and 43 and the drive circuits 44 and 45, as a result of which the reading head 7 is moved to the mark column 25 to check whether the printer 61 has ink or not (Steps S2 and S3). When the printer 61 has no ink, i.e., no ink mark 24 is in the mark column 25, immediately an alarm is given (Step S7). When the printer has ink, i.e., the ink mark 24 is printed in the mark column, the pulse motors 40 and 41 are further driven (Step S4), so that the reading head 7 is moved to the register mark 14 to determine whether or not the work slip 10 has been set at the predetermined position (Steps S5 and S6). When the register mark 14 is not at the predetermined position, i.e., the work slip 10 is shifted, similarly as in the above-described case an alarm is given (Step S7). When the register mark 14 is at the predetermined position, the pulse motor 41 is driven (Step S8). The read signals outputted by the reading heads 7 and 8, after being amplified by the amplifiers 46 and 47, are applied to the switching circuit, where they are alternately selected according to the switching signal SW from the CPU. The read signal thus selected is converted into the digital signal by the A/D converter 49. The digital signal is applied to the CPU 100. Accordingly, in the CPU 100, it can be determined from the output conditions of the switching signals SW whether the input signal comes from the reading head 7 or the reading head 8.

As the pulse motor 40 is driven, the reading mechanism 6 is moved in the direction of X-axis, and finally the reading head 8 reads the timing marks 13 (Steps S8 and S9). At this position, the movement of X-axis is stopped, and the pulse motor 41 is driven to move the reading head 7 in the direction of Y-axis (Step S10). When the reading head 7 reaches the work time data line 16, the counter 106 counts the pulse motor control signal PS from the gate circuit 105, so that the position of the data line, namely, the work is detected, and the position of the data line thus detected and the time data which is obtained from the count value of the counter 101 are stored in the memory 102 (Step S11 and S12). Next, the pulse motor 40 is driven to measure the time for the work (Steps S13 and S14). In this case, the pulse motor control signal PS is inputted into the time counting circuit 107, to measure the length of the time data line 16. This length data is stored in the memory 103 together with the time data.

After the length and the position of the time data line 16 are detected and stored as described above, the above-described reading operation is repeatedly carried out until the last timing mark 13 is reached (Step S16). When the last timing mark 13 (8:00 P.M.) is reached, the reading head 7 is moved to the item switching column 18 (Step S17), and then the reading mechanism is moved reversely in the direction of X-axis (Step S18). The read signal SM of the reading head 8 is supplied to the subtraction counter 109, where subtraction is effected successively with reverse driving, whereby the X-axis position can be detected at all times. The reading head 7 detects the item switching mark 17 in the item switching column 18. The detection data together with the time data are stored in the memory 111 (Steps S19 and S20).

The operation of detecting the item switching mark 17 is repeatedly carried out until the last item switching mark is reached. When the last item switching mark 17 is reached, the arithmetic circuit 110 calculates the total periods of time separately according to the kinds of work and the total periods of time separately according to the items by the utilization of the data stored in the memories 102, 103 and 111. These total periods of time are displayed on the display unit 5 and are printed in the respective columns 20 and 21 by the writing head 26 (Steps S22 and S23). If, in this case, the work time of the printing machine is continued to the work starting time (or 8:00 A.M.), the mark + is printed in the top of the operating time column in the time printing column 20; and if it is continued to the work ending time (or 8:00 P.M.), the mark + is printed in the tail of the operating time column. Thus, the work slip reading and summing operation has been achieved (Step S23).

As is apparent from the above description, according to the invention, the work time data lines written in the work slip are automatically read, the total periods of time are summed up separately according to the kinds of work and the items, and the total periods of time thus summed up are displayed and printed in the predetermined columns. Therefore, the efficiency in summation work is increased, and no error is involved in the summation.

What is claimed is:

1. A work slip reading and summing device comprising:

reading head means having
        a first reading head for automatically reading a time base data line on which work contents for a printing machine are recorded according to kinds of work with a time axis by basing on a work graph which is prepared by recording the work contents for said printing machine, and for automatically reading item switching marks recorded on said work slip, and
        a second reading head for automatically reading timing marks which represent said time axis;
    reading mechanism having a processing circuit and a writing head to sum up total periods of time separately according to said kinds of work and said items so as to print out said total periods of time on said work slip by basing on data read by said first and second reading head;
    operation control circuit for summing up total periods of time separately according to said kinds of work and said item;
    operation panel having display means which displays said total time, and placing plate for placing said work slip thereon;
    whereby to automatically read said work time data line recorded on said work slip and to display the total periods of time which are obtained by summing up separately according to the kinds of work and the items so as to print out the result of summing up in a predetermined column of said work slip.

2. The device claimed in claim 1, in which said reading mechanism is capable of automatic moving along an X axis direction over said placing plate.

3. The device claimed in claim 1, in which said first reading head is capable of automatic moving along a Y axis direction.

4. The device claimed in claim 1, in which said second reading head and said writing head are secured to said reading mechanism.

5. The device claimed in claim 1, further comprising means for automatically detecting whether said work slip is placed at a predetermined position of said placing plate.

6. The device claimed in claim 1, further comprising means for automatically detecting whether said writing head provides ink sufficiently.

* * * * *